J. BAILEY.
Swinging Gate.
No. 7,013.
Patented Jan'y 15, 1850.
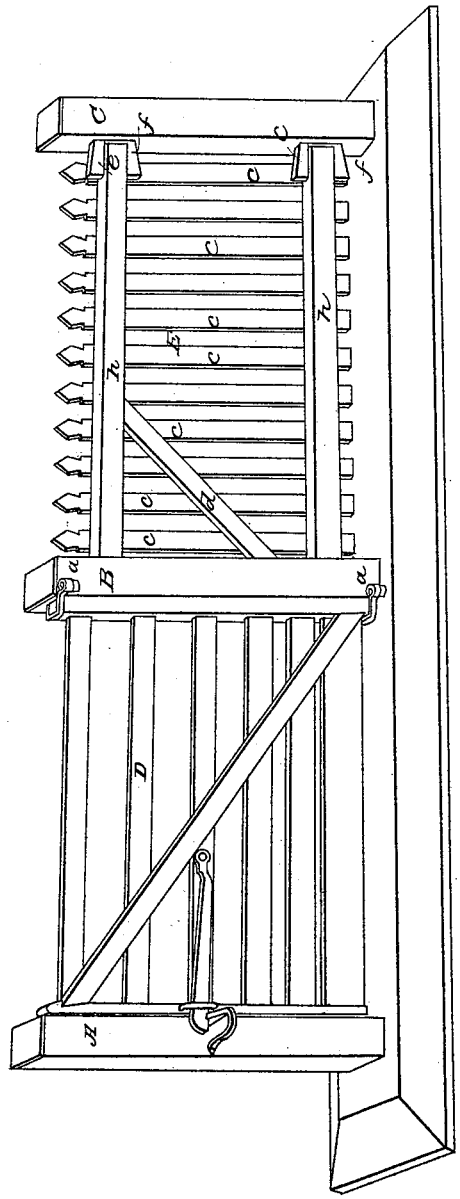

UNITED STATES PATENT OFFICE.

JESSE BAILEY, OF LEATHERWOOD, OHIO.

GATE FOR FENCES.

Specification of Letters Patent No. 7,013, dated January 15, 1850.

*To all whom it may concern:*

Be it known that I, JESSE BAILEY, of Leatherwood, in the county of Guernsey and State of Ohio, have invented a new and useful Improvement in Balanced Gates, of which the following is a full, clear, and exact description, reference being had to the accompanying drawing, which forms part of this specification, and which represents a perspective view of my balanced gate.

My invention consists in balancing the weight of the gate, by the weight of the panel of fence attached to the gate post.

In the drawing A, B, are two gate posts, to the last of which the gate D, is hung by hinges $a$, $a$. The panel of fence E adjoining the gate is firmly secured and braced to this gate post in such a manner that this gate post cannot sag toward the opposite gate post, without raising the opposite extremity of the panel of fence. The panel is formed in this instance of two rails $b$, $b$, united by palings $c$, and is firmly secured at one end to the gate post B to which it is braced by the diagonal bar $d$; the projecting extremities of the rails at the opposite ends of the panel are tenoned to enter mortises in the fence post C, where they are secured by wedges $e$, $e'$, $f$, $f'$ inserted above and below them, so that if the gate should sag, that end of the fence panel farthest from the gate post can be depressed by loosening the wedges $f$, $f'$, below the rails, and driving up those $e$, $e'$, above them, thus raising the outer extremity of the gate to the proper position to prevent it from dragging on the ground.

I have thus described my invention as applied to a single gate, but where the opening is wide, a two leaved gate may be employed instead of a single gate, and each leaf may be balanced in the manner herein set forth. It will be perceived that my invention does away with the balance levers, hitherto employed; it also supersedes the high gate posts, and framework employed to keep the post to which the gate is hung from sagging, while at the same time it furnishes an easy and efficient means of setting up the gate post to compensate for the sagging of the gate.

What I claim as my invention, and desire to secure by Letters Patent, is—

The method of balancing and adjusting gates by the panel of fence secured to the gate post, substantially as herein set forth.

In testimony whereof I have hereto subscribed my name.

JESSE BAILEY.

Witnesses:
E. S. REMRICK,
P. H. WATSON.